(12) United States Patent  
Asfur et al.

(10) Patent No.: US 9,336,130 B2  
(45) Date of Patent: May 10, 2016

(54) METHODS, SYSTEMS, AND COMPUTER READABLE MEDIA FOR PROVIDING BASIC INPUT/OUTPUT SYSTEM (BIOS) DATA AND NON-BIOS DATA ON THE SAME NON-VOLATILE MEMORY

(75) Inventors: Mahmud Asfur, Bat Yam (IL); Yonatan Tzafrir, Petah Tikva (IL)

(73) Assignee: SanDisk Technologies Inc., Plano, TX (US)

( * ) Notice: Subject to any disclaimer, the term of this patent is extended or adjusted under 35 U.S.C. 154(b) by 1197 days.

(21) Appl. No.: 13/308,117

(22) Filed: Nov. 30, 2011

(65) Prior Publication Data

US 2013/0138866 A1  May 30, 2013

(51) Int. Cl.
*G06F 12/02*  (2006.01)
*G06F 13/16*  (2006.01)

(52) U.S. Cl.
CPC ............ *G06F 12/02* (2013.01); *G06F 13/1684* (2013.01)

(58) Field of Classification Search
CPC ............................. G06F 12/02; G06F 13/1684
See application file for complete search history.

(56) References Cited

U.S. PATENT DOCUMENTS

| 5,519,843 | A | 5/1996 | Moran et al. |
| 5,535,357 | A | 7/1996 | Moran et al. |
| 7,827,376 | B2 | 11/2010 | Peterson et al. |
| 7,870,363 | B2 | 1/2011 | Tang et al. |
| 2008/0238612 | A1* | 10/2008 | Carpenter ............. G06F 21/575 340/5.74 |
| 2008/0282017 | A1* | 11/2008 | Carpenter ........... G06F 13/4291 710/316 |
| 2011/0126209 | A1* | 5/2011 | Housty ................. G06F 9/4405 718/105 |

OTHER PUBLICATIONS

"Serial ATA: High Speed Serialized AT Attachment," Revision 1.0a, pp. 1-311 (Jan. 7, 2003).
"Intel® Low Pin Count (LPC) Interface Specification," Intel, Revision 1.1, pp. 1-54 (Aug. 2002).

* cited by examiner

*Primary Examiner* — Glenn A Auve
(74) *Attorney, Agent, or Firm* — Jenkins, Wilson, Taylor & Hunt, P.A.

(57) ABSTRACT

Methods, systems, and computer readable media for providing BIOS data and non-BIOS data on the same non-volatile memory. According to one aspect, a system for providing BIOS data and non-BIOS data on the same non-volatile memory includes a controller for controlling access by a host to a non-volatile memory for storing data, the data including BIOS data and non-BIOS data. The controller includes a first bus interface for communicating data to and from the host via a first bus of a first bus protocol, a second bus interface for communicating data to and from the host via a second bus of a second bus protocol, and a third interface for communicating data to and from the non-volatile memory. The first bus comprises a bus that is operable after power-on reset and before BIOS is accessed.

33 Claims, 5 Drawing Sheets

500 — AT A BUS CONTROLLER HAVING A FIRST BUS INTERFACE FOR COMMUNICATING DATA TO AND FROM A HOST VIA A FIRST BUS OF A FIRST BUS PROTOCOL, THE FIRST BUS INTERFACE HAVING A RESET SIGNAL INPUT FOR RECEIVING A RESET REQUEST FOR RESETTING THE FIRST INTERFACE WITHOUT RESETTING THE CONTROLLER, AND A SECOND BUS INTERFACE FOR COMMUNICATING DATA TO AND FROM THE HOST VIA A SECOND BUS OF A SECOND BUS PROTOCOL, THE SECOND BUS INTERFACE LACKING A RESET SIGNAL INPUT FOR RECEIVING A RESET REQUEST FOR RESETTING THE SECOND INTERFACE WITHOUT RESETTING THE CONTROLLER, DETECT A RESET REQUEST ON THE RESET SIGNAL INPUT OF THE FIRST BUS INTERFACE

502 — IN RESPONSE TO DETECTING THE RESET REQUEST, RESET AT LEAST ONE OF THE FIRST BUS INTERFACE AND THE SECOND BUS INTERFACE WITHOUT RESETTING PORTIONS OF THE CONTROLLER OTHER THAN THE AT LEAST ONE OF THE FIRST BUS INTERFACE AND THE SECOND BUS INTERFACE

FIG. 5

METHODS, SYSTEMS, AND COMPUTER READABLE MEDIA FOR PROVIDING BASIC INPUT/OUTPUT SYSTEM (BIOS) DATA AND NON-BIOS DATA ON THE SAME NON-VOLATILE MEMORY

TECHNICAL FIELD

The subject matter described herein relates to methods and systems for reducing the chip count in computer systems and devices. More particularly, the subject matter described herein relates to methods, systems, and computer readable media for providing BIOS data and non-BIOS data on the same non-volatile memory.

BACKGROUND

Conventional computer system architectures include three types of memory: random access memory (RAM), which is used as a work area for the operating system and applications and which is typically volatile memory; read only memory (ROM), which is used to store code that does not or should not change, such as the BIOS; and some form of non-volatile mass storage memory, such as a hard disk drive (HDD), which is used to store files, applications, etc. With the advent of FLASH memory and improvements in the reliability and lifetimes of FLASH memories, there is a trend to replace HDDs with SSDs, which have no moving parts and typically consume less power and space than their HDD counterparts. The use of SSDs allows the development of smaller and smaller computers and consumer devices, such as smart phones, handheld computers, and the like. Recent computer system architectures, however, continue to adhere to the legacy convention of maintaining a separate ROM for storing the BIOS. As used herein, the term "BIOS" refers to program code executed by a processor to perform BIOS functions, along with any data structures that may be used to store initial parameters or other information needed by the program code to perform the BIOS functions.

FIGS. 1A and 1B illustrate examples of this conventional architecture. FIG. 1A illustrates a system which includes a host processor 100 which supports two separate buses: a serial ATA (SATA) bus 102 and a low pin count (LPC) bus 104. Host 100 includes a SATA bus interface controller (SATA I/F) 106 and a low pin count (LPC) bus interface controller (LPC I/F) 108. Host 100 uses SATA I/F 106 to communicate with a mass storage device MSD 110, which is typically an HDD or SDD, via a second SATA interface controller 112. Host 100 uses LPC I/F 106 to communicate with a ROM which is used to store the BIOS (ROM BIOS) 114 via a second LPC bus interface controller 116. FIG. 1B illustrates another conventional architecture, which improves upon the architecture in FIG. 1A by replacing ROM BIOS 114 with a FLASH memory that is used to store the BIOS (FLASH BIOS) 120. FLASH BIOS 120 also uses an LPC I/F controller 116.

There are disadvantages associated with the conventional architectures described above, however. The systems illustrated in FIGS. 1A and 1B have several chips; not including additional LPC peripherals such as P1 118, these systems include at least five chips: host 100, second SATA I/F 112, HDD or SDD 110, second LPC I/F 116, and either ROM 114 or FLASH 120. Even if the second SATA I/F 112 is integrated with SDD 110 and the BIOS is integrated with its respective interface controller chip, the system has three separate chips.

There are other disadvantages associated with the conventional architectures shown in FIGS. 1A and 1B as well. The BIOS that is located in FLASH 120 cannot simply be moved into SDD 110, because SATA I/F 112 is not operable after a power-on reset: it first requires that a SATA driver be loaded from BIOS to host 100. If the BIOS was itself on a SATA device, the BIOS could not be accessed until the SATA device driver was loaded, and the SATA device driver cannot be loaded until BIOS was accessed—a circular dependency that never resolves.

Accordingly, in light of these disadvantages associated with conventional architectures, there exists a need for methods, systems, and computer readable media for providing BIOS data and non-BIOS data on the same non-volatile memory.

SUMMARY

According to one aspect, the subject matter described herein includes a system for providing BIOS data and non-BIOS data on the same non-volatile memory. The system includes a controller for controlling access by a host to a non-volatile memory for storing data, the data including BIOS data and non-BIOS data. The controller includes a first bus interface for communicating data to and from the host via a first bus of a first bus protocol, a second bus interface for communicating data to and from the host via a second bus of a second bus protocol, and a third interface for communicating data to and from the non-volatile memory. The first bus comprises a bus that is operable after power-on reset and before BIOS is accessed.

According to another aspect, the subject matter described herein includes a system for providing a capability to reset a bus interface that lacks a dedicated reset signal. The system includes a bus controller having a first bus interface for communicating data to and from the host via a first bus of a first bus protocol, the first bus interface having a reset signal input for receiving a reset request for resetting the first interface without resetting the controller, and a second bus interface for communicating data to and from the host via a second bus of a second bus protocol, the second bus interface lacking a reset signal input for receiving a reset request for resetting the second interface without resetting the controller. The controller is configured to detect a reset request on the reset signal input of the first bus interface, and, in response to detecting the reset request, reset at least one of the first bus interface and the second bus interface without resetting portions of the controller other than the at least one of the first bus interface and the second bus interface.

According to yet another aspect, the subject matter described herein includes a system for providing BIOS data and non-BIOS data on the same non-volatile memory. The system includes a non-volatile memory for storing data, the data including BIOS data and non-BIOS data, and a controller for controlling access by a host to the non-volatile memory. The controller includes a first bus interface for communicating data to and from the host via a first bus of a first bus protocol, a second bus interface for communicating data to and from the host via a second bus of a second bus protocol, and a third interface for communicating data to and from the non-volatile memory. The first bus comprises a bus that is operable after power-on reset and before BIOS is accessed.

According to yet another aspect, the subject matter described herein includes a system for providing BIOS data and non-BIOS data on the same non-volatile memory. The system includes a non-volatile memory for storing data, the data including BIOS data and non-BIOS data, and a bus controller for controlling access by a host to the non-volatile memory. The controller includes a first bus interface for communicating data to and from the host via a first bus of a first bus protocol, the first bus interface having a reset signal input for receiving a reset request for resetting the first interface without resetting the controller, a second bus interface for communicating data to and from the host via a second bus of a second bus protocol, the second bus interface lacking a reset signal input for receiving a reset request for resetting the second interface without resetting the controller, and a third interface for communicating data to and from the non-volatile memory. The controller is configured to detect a reset request on the reset signal input of the first bus interface, and, in response to detecting the reset request, reset at least one of the first bus interface and the second bus interface without resetting portions of the controller other than the at least one of the first bus interface and the second bus interface.

According to yet another aspect, the subject matter described herein includes a method for providing BIOS data and non-BIOS data on the same non-volatile memory. The method includes, at a controller for controlling access by a host to a non-volatile memory for storing data, the data including BIOS data and non-BIOS data, the controller having a first bus interface for communicating data to and from the host via a first bus of a first bus protocol, a second bus interface for communicating data to and from the host via a second bus of a second bus protocol, and a third interface for communicating data to and from the non-volatile memory: performing a power-on reset; providing access to BIOS data via the first bus interface; using at least some of the BIOS data to render operable the second bus interface; and providing access to non-BIOS data via the second bus interface.

According to yet another embodiment, the subject matter described herein includes a method for providing a capability to reset a bus interface that lacks a dedicated reset signal. The method includes, at a bus controller having a first bus interface for communicating data to and from a host via a first bus of a first bus protocol, the first bus interface having a reset signal input for receiving a reset request for resetting the first interface without resetting the controller, and a second bus interface for communicating data to and from the host via a second bus of a second bus protocol, the second bus interface lacking a reset signal input for receiving a reset request for resetting the second interface without resetting the controller: detecting a reset request on the reset signal input of the first bus interface, and, in response to detecting the reset request, resetting at least one of the first bus interface and the second bus interface without resetting portions of the controller other than the at least one of the first bus interface and the second bus interface.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 5 is a flow chart illustrating an exemplary process for providing a capability to reset a bus interface that lacks a dedicated reset signal according to an embodiment of the subject matter described herein.

DETAILED DESCRIPTION

In accordance with the subject matter disclosed herein, systems, methods, and computer readable media are provided for providing BIOS data and non-BIOS data on the same non-volatile memory. Reference will now be made in detail to exemplary embodiments of the present invention, examples of which are illustrated in the accompanying drawings. Wherever possible, the same reference numbers will be used throughout the drawings to refer to the same or like parts.

Figure 1A:
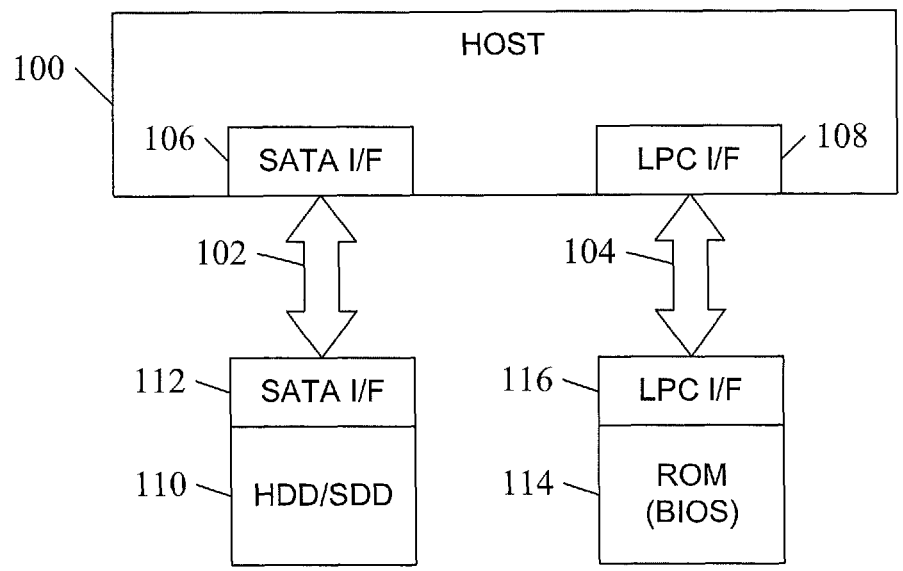
FIGS. 1A and 1B illustrate examples of conventional architectures for systems that include mass storage memory that is separate from BIOS stored in non-volatile memory such as ROM or FLASH.
Figure 1B:
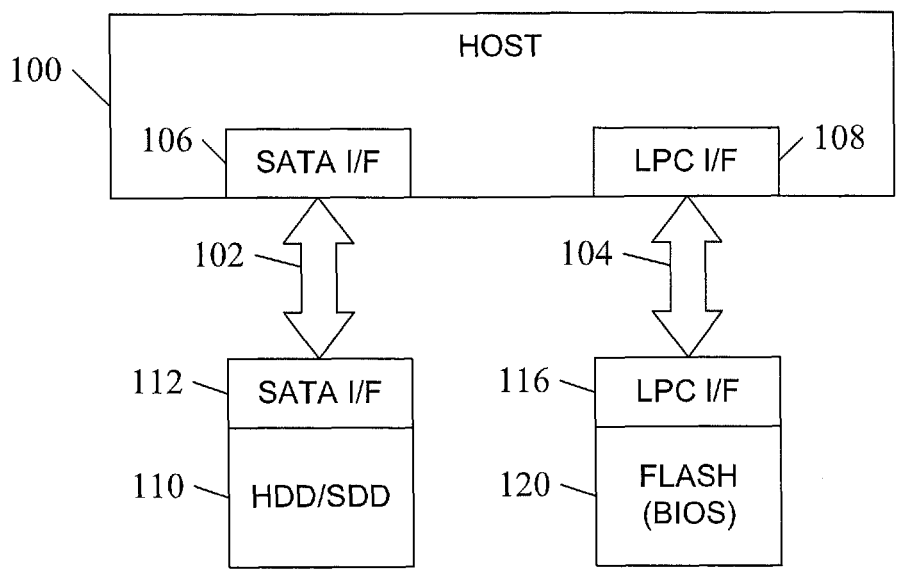
Figure 2:
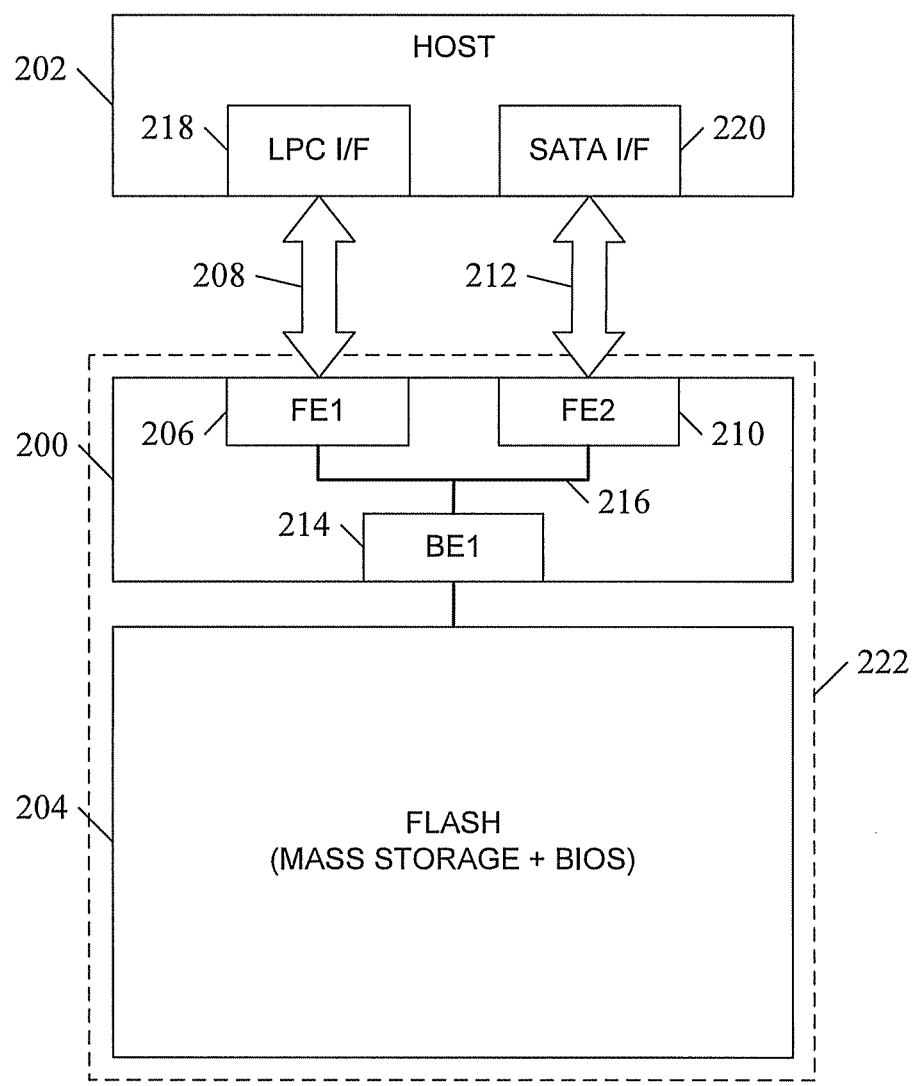
FIG. 2 is a block diagram illustrating an exemplary system for providing BIOS data and non-BIOS data on the same non-volatile memory according to an embodiment of the subject matter described herein.

FIG. 2 is a block diagram illustrating an exemplary system for providing BIOS data and non-BIOS data on the same non-volatile memory according to an embodiment of the subject matter described herein. In the embodiment illustrated in FIG. 2, a controller 200 controls access by a host 202 to a non-volatile memory 204 for storing data, the data including BIOS data and non-BIOS data. Non-volatile memory 204 may be FLASH memory, which may be organized as a solid state drive, or SSD. Controller 200 includes a first bus interface 206 for communicating data to and from host 202 via a first bus 208 of a first bus protocol, a second bus interface 210 for communicating data to and from host 202 via a second bus 212 of a second bus protocol, and a third interface 214 for communicating data to and from non-volatile memory 204. First bus 208 is a bus that is operable after power-on reset and before BIOS is accessed. In the embodiment illustrated in FIG. 2, first bus interface 206 is also referred to as the first front-end interface, or "FE1", second bus interface 210 is also referred to as the second front-end interface, or "FE2", and third interface 214 is also referred to as the first back-end interface, or "BE1". In the embodiment illustrated in FIG. 2, the three interfaces are connected internally via an internal bus 216, and third interface 214 is an interface for communicating data to and from a FLASH memory. Internal bus 216 may be for example a shared bus, a point-to-point bus, a switch fabric or switch matrix, or other suitable means for communicating data between host 202 and non-volatile memory 204.

One obstacle to providing both BIOS and non-BIOS data on the same non-volatile memory, such as FLASH or a solid state drive, that uses a SATA interface is that although the SATA interface is suitable for mass transfer of non-BIOS data to and from the FLASH memory, the SATA interface is not immediately operable after reset, but requires firmware to be first loaded, making a SATA-only controller unable to perform the initial BIOS accesses. This obstacle is overcome by controller 200, since first bus interface 206 is operational immediately after reset without requiring firmware. In the embodiment illustrated in FIG. 2, for example, first bus 208 is a low pin count (LPC) bus that connects first bus interface 206 to an LPC interface 218 on host 202. The LPC protocol is simple enough that an LPC interface does not require that firmware (e.g., BIOS, drivers, or other firmware) to be loaded into the interface before the interface can be operational. In another embodiment, first bus 208 may be a serial peripheral interconnect (SPI) interface or other interface that similarly does not require a firmware load before the interface can be operational. In the embodiment illustrated in FIG. 2, second bus interface 210 is a SATA bus interface that communicates with a corresponding SATA bus interface 220 on host 202.

After reset, host 202 may use LPC bus 208 to access the BIOS stored within non-volatile memory 204. In the embodiment illustrated in FIG. 2, for example, the data path for transferring BIOS between host 202 and non-volatile memory 204 includes the host's LPC interface 218, LPC bus 208, the controller's LPC interface 206, internal bus 216, and back-end interface 214. Host 202 may use LPC bus 208 to copy BIOS from non-volatile memory 204 to host 202 or to RAM memory that is also on LPC bus 208, for example.

In one embodiment, second bus interfaces 210 and/or 220 may require BIOS or firmware to be accessed before they are operational. In that scenario, host 202 may retrieve firmware, such as a SATA device driver, from non-volatile memory 204 using LPC bus 208. Once the device driver is installed and operational, host 202 may then activate its SATA interface 220 and use SATA bus 212 for bulk transfers of mass storage to and from non-volatile memory 204. In the embodiment illustrated in FIG. 2, for example, the data path for transferring non-BIOS data between host 202 and non-volatile memory 204 includes the host's SATA interface 220, SATA bus 212, the controller's SATA interface 210, internal bus 216, and back-end interface 214. Although FIG. 2 illustrates an embodiment in which second bus 212 is a SATA bus, other buses may be used instead, such as a peripheral component interconnect (PCI) bus, a PCI express (PCIe) bus, a PCI extended (PCI-X) bus, and an integrated drive electronics (IDE) interface. In one embodiment, host 202 may continue to use first bus 208 to access BIOS or non-BIOS data on non-volatile memory 204.

In this manner, a system that uses controller 200 can store both BIOS data and non-BIOS data in the same non-volatile memory 204. In one embodiment, host 202 may use first bus 208 to perform byte-by-byte data transfers and use second bus 212 to perform multi-byte or bulk data transfers. In one embodiment, controller 200 and non-volatile memory 204 may be combined into one device 222, such as a solid state drive.

In one embodiment, one or both of the first and second bus protocols is a bus protocol that allows controller 200 rather than host 202 to operate as a bus master. For example, with the addition of optional pins, LPC bus interface 206 supports bus mastering by controller 200. This give controller 200 the ability to perform initialization routines on behalf of host 202 (or while host 202 is finishing its internal initialization routines) such as downloading BIOS or firmware from non-volatile memory 204 to other peripherals that share LPC bus 208.

Figure 3:
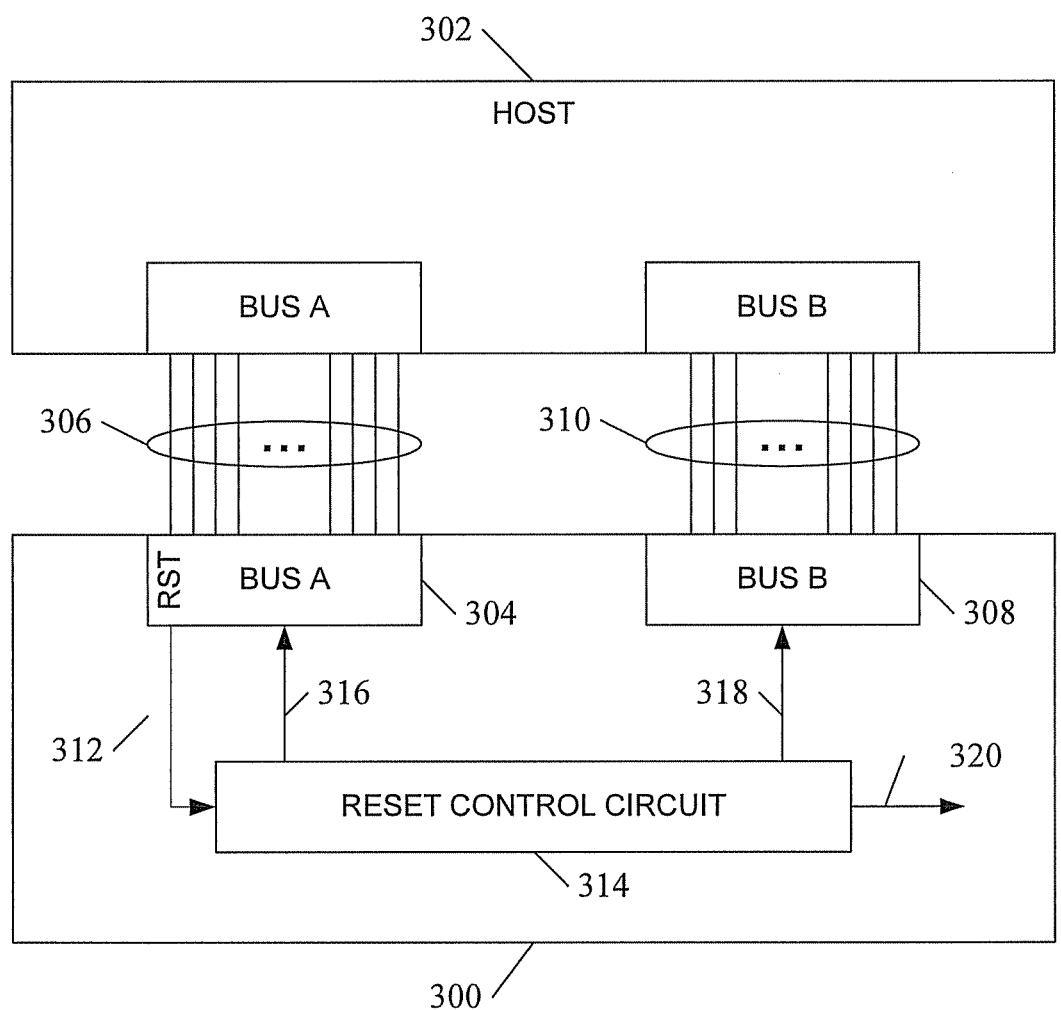
FIG. 3 is a block diagram illustrating an exemplary system for providing a capability to reset a bus interface that lacks a dedicated reset signal according to an embodiment of the subject matter described herein.

FIG. 3 is a block diagram illustrating an exemplary system for providing a capability to reset a bus interface that lacks a dedicated reset signal according to an embodiment of the subject matter described herein. In the embodiment illustrated in FIG. 3, controller 300 communicates data to and from a host 302. Controller 300 includes a first bus interface 304 for communicating data to and from host 302 via a first bus 306 of a first bus protocol, the first bus interface having a reset signal input RST for receiving a reset request for resetting the first interface without resetting controller 300. Examples of bus interfaces having a reset signal input include an LPC interface, a PCI bus interface, a PCI-X bus interface, and an IDE bus interface.

Controller 300 also includes a second bus interface 308 for communicating data to and from host 302 via a second bus 310 of a second bus protocol, second bus interface 308 lacking a reset signal input for receiving a reset request for resetting the second interface without resetting the controller. Examples of bus interfaces that lack a reset signal input include a SATA interface and a PCIe interface.

Controller 300 is configured to detect a reset request on reset signal input RST of first bus interface 304. In response to detecting the reset request, in one embodiment controller 300 resets both first bus interface 304 and second bus interface 306.

In one embodiment, controller 300 resets both bus interfaces without resetting any other portions of the controller. This is useful when second bus interface 308, which does not have a reset input signal, locks up or otherwise becomes inoperative. In that event, host 302 may detect that bus 310 is not working and use the reset signal of bus 306 to reset second bus interface 308 in an attempt to restore bus 310 to working condition without resorting to the drastic measure of resetting controller 300 completely.

Alternatively, controller 300 may respond to a reset request on reset signal input RST of bus interface 304 by performing a full reset of controller 300. This arrangement is useful where controller 300 is remote from host 302, e.g., where host 302 does not have access to or control of a master reset pin on controller 300 or where controller 300 does not have master reset pin.

In the embodiment illustrated in FIG. 3, the value of RST is sent, either directly or buffered, as signal 312 into a reset control circuit 314. In one embodiment, reset control circuit 314 outputs separate reset signals 316 and 318 to first bus interface 304 and second bus interface 308 respectively. Alternatively, a single reset signal may be sent to both bus interfaces. This arrangement allows controller 300 to reset the bus interface circuits without resetting the entire controller.

In one embodiment, reset control circuit 314 may be configured to detect a non-standard signal voltage or sequence on reset signal input RST of first bus interface 304 and respond by resetting second bus interface 308 without resetting first bus interface 304.

It will be understood that features of the system illustrated in FIG. 2 may be combined with features of the system illustrated in FIG. 3. For example, in one embodiment, controller 300 may include a third interface for communicating data to and from a non-volatile memory, such as FLASH. In this embodiment, controller 300 may be a component of a solid state drive. The non-volatile memory may be used for storing both BIOS data and non-BIOS data. Likewise, at least one of buses 306 and 310 may allow controller 300 to act as bus master. A controller with bus mastering capability could perform some functions that would otherwise require yet another chip in the system, such as direct memory access (DMA). Being a bus master would allow controller 300, for example, to perform some tasks such as loading BIOS into RAM at boot time, locking or unlocking a keyboard, and so on. In this manner, a system could include a host that supports two buses, one for data access and another for peripheral access (e.g., SATA and LPC, respectively, but other combinations are also contemplated), and use just one chip having non-volatile memory 204, controller 200, and also DMA or other bus mastering functions. This would allow a reduction of chip count at the same time as an increase in system capability. Just having a DMA, for example, could allow host 202 to have more resources to dedicate to other tasks. Controller 200 could perform functions during and/or after boot time, i.e., whether or not host 202 is operating.

Controllers 200 and 300 may implement their respective bus interfaces using dedicated logic or circuitry. Alternatively, they may emulate the function of a bus interface and/or the function of an internal bus using software executing within the controller, which is colloquially referred to as "bit-banging."

An additional advantage to the embodiments illustrated in FIGS. 2 and 3 is that a single controller that communicates with a host via two different bus interfaces has the capability to read passwords, encryption or decryption keys, or other authentication information from data storage and provide this information to the host or other peripherals separately from the data that the password or key will be used to process. For example, in the embodiment illustrated in FIG. 2, controller 200 could send an encrypted stream of data from non-volatile memory 204 to host 202 via SATA bus 212 and send the encryption key to host 202 via LPC bus 208. The use of separate buses to transport the encryption key separate from the data to be encrypted or decrypted provides some additional security due to the fact that to retrieve both key and stream requires that two buses be monitored rather than just one.

Figure 4:
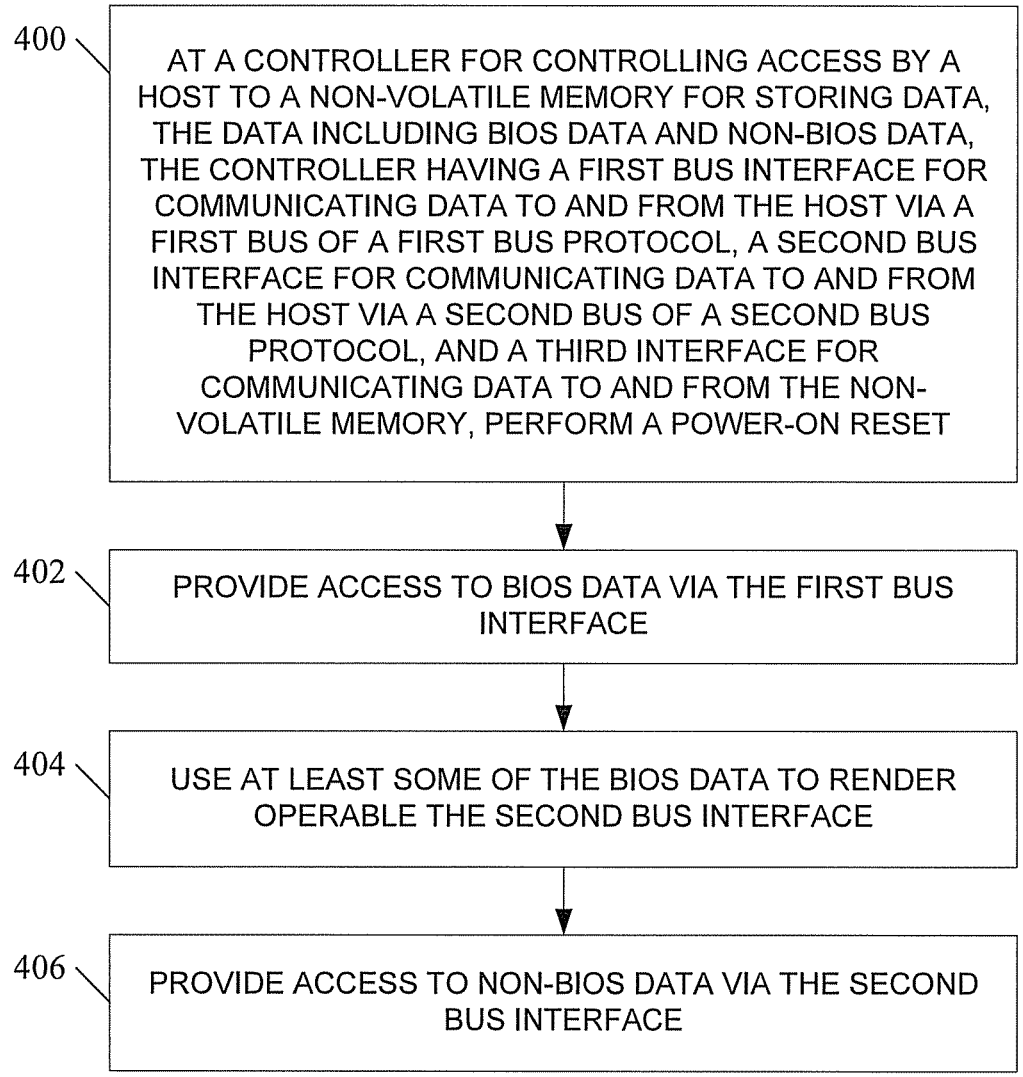
FIG. 4 is a flow chart illustrating an exemplary process for providing BIOS data and non-BIOS data on the same non-volatile memory according to an embodiment of the subject matter described herein.

FIG. 4 is a flow chart illustrating an exemplary process for providing BIOS data and non-BIOS data on the same non-volatile memory according to an embodiment of the subject matter described herein. At a controller for controlling access by a host to a non-volatile memory for storing data, the data including BIOS data and non-BIOS data, the controller having a first bus interface for communicating data to and from the host via a first bus of a first bus protocol, a second bus interface for communicating data to and from the host via a second bus of a second bus protocol, and a third interface for communicating data to and from the non-volatile memory, step 400 includes performing a power-on reset. At step 402, access to BIOS data is provided via the first bus interface. At step 404, at least some of the BIOS data is used to render operable the second bus interface. At step 406, access to non-BIOS data is provided via the second bus interface.

FIG. 5 is a flow chart illustrating an exemplary process for providing a capability to reset a bus interface that lacks a dedicated reset signal according to an embodiment of the subject matter described herein. At a bus controller having a first bus interface for communicating data to and from a host via a first bus of a first bus protocol, the first bus interface having a reset signal input for receiving a reset request for resetting the first interface without resetting the controller, and a second bus interface for communicating data to and from the host via a second bus of a second bus protocol, the second bus interface lacking a reset signal input for receiving a reset request for resetting the second interface without resetting the controller, step 500 includes detecting a reset request on the reset signal input of the first bus interface. At step 502, in response to detecting the reset request, at least one of the first bus interface and the second bus interface is reset without resetting portions of the controller other than the at least one of the first bus interface and the second bus interface.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for providing basic input/output system (BIOS) data and non-BIOS data on the same non-volatile memory, the system comprising:
   a controller for controlling access by a host to a non-volatile memory for storing data, the data including BIOS data and non-BIOS data, the controller comprising:
   a first bus interface for communicating data to and from the host via a first bus of a first bus protocol;
   a second bus interface for communicating data to and from the host via a second bus of a second bus protocol; and
   a third interface for communicating data to and from the non-volatile memory,
   wherein the first bus comprises a bus that is operable after power-on reset and before BIOS is accessed.

2. The system of claim 1 wherein the controller provides BIOS data to the host via the first bus interface.

3. The system of claim 2 wherein the controller provides non-BIOS data to the host via at least one of the first bus interface and the second bus interface.

4. The system of claim 1 wherein the second bus interface comprises a bus interface that is not operable until after BIOS is accessed.

5. The system of claim 4 wherein the controller provides at least one of BIOS data and non-BIOS data after BIOS has been provided to the host via the first bus interface.

6. The system of claim 1 wherein the first bus interface comprises one of:
   a low pin count (LPC) bus interface; and
   a serial peripheral interface (SPI) bus interface.

7. The system of claim 1 wherein the second bus interface comprises one of:
   a serial advanced technology attachment (SATA) bus interface;
   a peripheral component interconnect (PCI) bus interface;
   a peripheral component interconnect express (PCIe) bus interface;
   a peripheral component interconnect extended (PCI-X) bus interface; and
   an integrated drive electronics (IDE) bus interface.

8. The system of claim 1 wherein BIOS data comprises program code to perform BIOS functions.

9. The system of claim 1 wherein at least one of the first bus protocol and the second bus protocol comprises a bus protocol that allows the controller to be a bus master.

10. The system of claim 1 wherein the first bus protocol comprises a bus protocol that supports single byte data transfers.

11. The system of claim 1 wherein the second bus protocol comprises a bus protocol that supports multi-byte bulk data transfers.

12. The system of claim 1 wherein the third interface for communicating data to and from the non-volatile memory comprises an interface for communicating data to and from FLASH memory.

13. The system of claim 1 wherein the controller is a component of a solid state drive.

14. A system for providing a capability to reset a bus interface that lacks a dedicated reset signal, the system comprising:
a bus controller comprising:
a first bus interface for communicating data to and from a host via a first bus of a first bus protocol, the first bus interface having a reset signal input for receiving a reset request for resetting the first interface without resetting the controller; and
a second bus interface for communicating data to and from the host via a second bus of a second bus protocol, the second bus interface lacking a reset signal input for receiving a reset request for resetting the second interface without resetting the controller,
wherein the controller is configured to detect a reset request on the reset signal input of the first bus interface, and, in response to detecting the reset request, reset at least one of the first bus interface and the second bus interface without resetting portions of the controller other than the at least one of the first bus interface and the second bus interface.

15. The system of claim 14 wherein the controller is configured to, in response to detecting the reset request, reset the entire controller including the first and second bus interfaces.

16. The system of claim 14 wherein the first bus interface having a reset signal input comprises one of:
a low pin count (LPC) bus interface;
a peripheral component interconnect (PCI) bus interface;
a peripheral component interconnect extended (PCI-X) bus interface; and
an integrated drive electronics (IDE) bus interface.

17. The system of claim 14 wherein the second bus interface lacking a reset signal input comprises one of:
a serial advanced technology attachment (SATA) bus interface; and
a peripheral component interconnect express (PCIe) bus interface.

18. The system of claim 14 wherein the controller comprises a third interface for communicating data to and from a non-volatile memory.

19. The system of claim 18 wherein the non-volatile memory contains both BIOS data and non-BIOS data.

20. The system of claim 14 wherein BIOS data comprises program code to perform BIOS functions.

21. The system of claim 14 wherein at least one of the first bus protocol and the second bus protocol comprises a bus protocol that allows the controller to be a bus master.

22. The system of claim 14 wherein the controller comprises a FLASH memory controller.

23. The system of claim 14 wherein the controller is a component of a solid state drive.

24. A system for providing basic input/output system (BIOS) data and non-BIOS data on the same non-volatile memory, the system comprising:
a non-volatile memory for storing data, the data including BIOS data and non-BIOS data; and
a controller for controlling access by a host to the non-volatile memory, wherein the controller includes a first bus interface for communicating data to and from the host via a first bus of a first bus protocol, a second bus interface for communicating data to and from the host via a second bus of a second bus protocol, and a third interface for communicating data to and from the non-volatile memory, wherein the first bus comprises a bus that is operable after power-on reset and before BIOS is accessed.

25. The system of claim 24 wherein the non-volatile memory comprises FLASH memory.

26. The system of claim 24 wherein BIOS data comprises program code to perform BIOS functions.

27. The system of claim 24 wherein the non-volatile memory and controller are components of a solid state drive.

28. A system for providing basic input/output system (BIOS) data and non-BIOS data on the same non-volatile memory, the system comprising:
a non-volatile memory for storing data, the data including BIOS data and non-BIOS data; and
a bus controller for controlling access by a host to the non-volatile memory, wherein the controller includes:
a first bus interface for communicating data to and from the host via a first bus of a first bus protocol, the first bus interface having a reset signal input for receiving a reset request for resetting the first interface without resetting the controller;
a second bus interface for communicating data to and from the host via a second bus of a second bus protocol, the second bus interface lacking a reset signal input for receiving a reset request for resetting the second interface without resetting the controller; and
a third interface for communicating data to and from the non-volatile memory,
wherein the controller is configured to detect a reset request on the reset signal input of the first bus interface, and, in response to detecting the reset request, reset at least one of the first bus interface and the second bus interface without resetting portions of the controller other than the at least one of the first bus interface and the second bus interface.

29. The system of claim 28 wherein the controller is configured to, in response to detecting the reset request, reset the entire controller including the first and second bus interfaces.

30. A method for providing basic input/output system (BIOS) data and non-BIOS data on the same non-volatile memory, the method comprising:
at a controller for controlling access by a host to a non-volatile memory for storing data, the data including BIOS data and non-BIOS data, the controller having a first bus interface for communicating data to and from the host via a first bus of a first bus protocol, a second bus interface for communicating data to and from the host via a second bus of a second bus protocol, and a third interface for communicating data to and from the non-volatile memory:
performing a power-on reset;
providing access to BIOS data via the first bus interface;
using at least some of the BIOS data to render operable the second bus interface; and
providing access to non-BIOS data via the second bus interface.

31. A method for providing a capability to reset a bus interface that lacks a dedicated reset signal, the method comprising:
at a bus controller having a first bus interface for communicating data to and from a host via a first bus of a first bus protocol, the first bus interface having a reset signal input for receiving a reset request for resetting the first interface without resetting the controller, and a second bus interface for communicating data to and from the host via a second bus of a second bus protocol, the second bus interface lacking a reset signal input for receiving a reset request for resetting the second interface without resetting the controller:

detecting a reset request on the reset signal input of the first bus interface; and in response to detecting the reset request, resetting at least one of the first bus interface and the second bus interface without resetting portions of the controller other than the at least one of the first bus interface and the second bus interface.

32. A non-transitory computer readable medium having stored thereon executable instructions that when executed by a processor of a computer control the computer to perform steps comprising:

at a controller for controlling access by a host to a non-volatile memory for storing data, the data including BIOS data and non-BIOS data, the controller having a first bus interface for communicating data to and from the host via a first bus of a first bus protocol, a second bus interface for communicating data to and from the host via a second bus of a second bus protocol, and a third interface for communicating data to and from the non-volatile memory:

performing a power-on reset;

providing access to BIOS data via the first bus interface;

using at least some of the BIOS data to render operable the second bus interface; and providing access to non-BIOS data via the second bus interface.

33. A non-transitory computer readable medium having stored thereon executable instructions that when executed by a processor of a computer control the computer to perform steps comprising:

at a bus controller having a first bus interface for communicating data to and from a host via a first bus of a first bus protocol, the first bus interface having a reset signal input for receiving a reset request for resetting the first interface without resetting the controller, and a second bus interface for communicating data to and from the host via a second bus of a second bus protocol, the second bus interface lacking a reset signal input for receiving a reset request for resetting the second interface without resetting the controller:

detecting a reset request on the reset signal input of the first bus interface; and in response to detecting the reset request, resetting at least one of the first bus interface and the second bus interface without resetting portions of the controller other than the at least one of the first bus interface and the second bus interface.

* * * * *